United States Patent [19]

Roze

[11] Patent Number: 4,823,950

[45] Date of Patent: Apr. 25, 1989

[54] STORAGE ARRANGEMENT FOR OPTICAL DISCS AND THEIR CONTAINERS

[76] Inventor: Paul F. Roze, 8 Rue de la Lande Seche, Cesson - Sevigne, France, 35-510

[21] Appl. No.: 168,212

[22] Filed: Mar. 15, 1988

[51] Int. Cl.[4] ............................................. B65D 85/57
[52] U.S. Cl. .................................... 206/311; 206/387; 206/444; 206/472; 206/473
[58] Field of Search ............... 206/311, 387, 444, 460, 206/472, 473, 477, 479, 483; 211/40; 312/8, 9, 10

[56] References Cited

U.S. PATENT DOCUMENTS

| | | | |
|---|---|---|---|
| 1,445,593 | 2/1923 | Iscowitz | 206/472 |
| 3,743,081 | 7/1973 | Roberg et al. | 206/387 |
| 3,848,738 | 11/1974 | Hirsch | 206/387 |
| 3,851,762 | 12/1974 | Liblick | 206/460 |
| 4,274,537 | 6/1981 | Cooper | 206/472 |
| 4,512,468 | 4/1985 | Stravitz | 206/387 |
| 4,641,750 | 2/1987 | Johnson et al. | 206/472 |

FOREIGN PATENT DOCUMENTS

| | | | |
|---|---|---|---|
| 928259 | 6/1973 | Canada | 217/142 |
| 0086542 | 8/1983 | European Pat. Off. | |
| 2319334 | 11/1974 | Fed. Rep. of Germany | 206/473 |
| 2451347 | 5/1976 | Fed. Rep. of Germany | |
| 795310 | 3/1936 | France | 206/235 |
| 2221784 | 11/1974 | France | |
| 2305923 | 11/1976 | France | |
| 8001570 | 10/1981 | Netherlands | |
| 659147 | 12/1986 | Switzerland | 206/387 |
| 1601673 | 11/1981 | United Kingdom | |

OTHER PUBLICATIONS

Stereo Review, vol. 50, No. 4, Apr. 1985, p. 42.

Primary Examiner—David T. Fidei
Attorney, Agent, or Firm—Pollock, Vande Sande & Priddy

[57] ABSTRACT

A storage container for optical discs and their containers comprises a rectangular frame with a support for accommodating up to four optical discs. A pair of planar members and associated frames accommodate a further four optical discs. The planar members and rectangular frame are hinged to rotate like pages in a book. Inset magnets, inset in the frames, releasably retain the rectangular frame, planar members and associated frames in a closed condition.

5 Claims, 2 Drawing Sheets

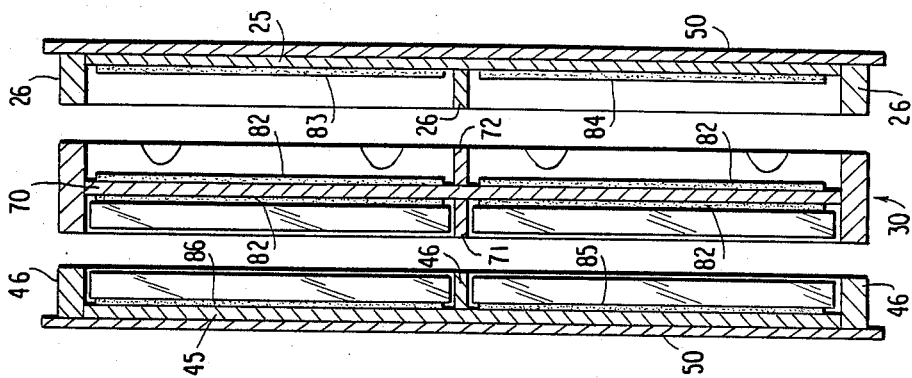
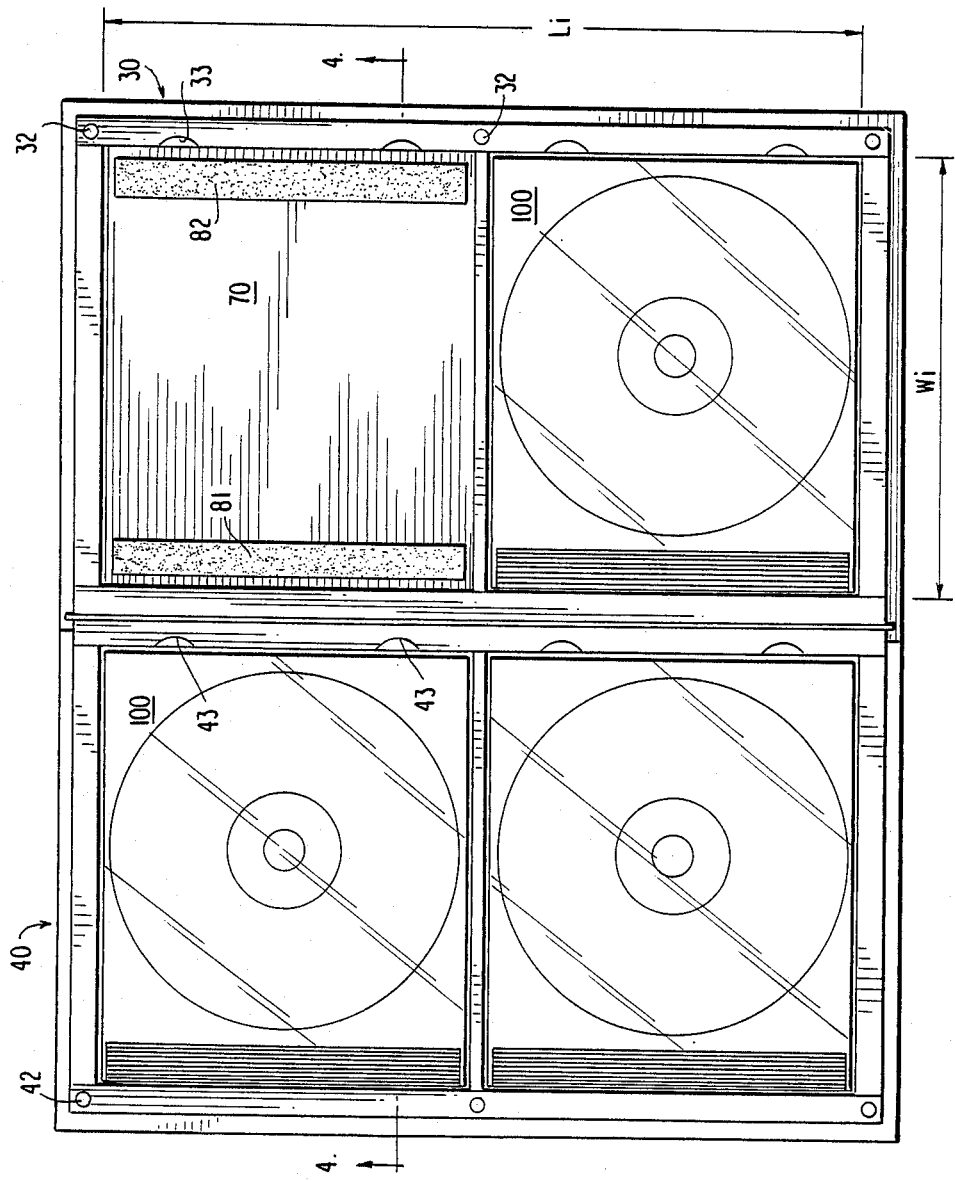

STORAGE ARRANGEMENT FOR OPTICAL DISCS AND THEIR CONTAINERS

TECHNICAL FIELD

The invention relates to a container for storing optical discs and their containers.

BACKGROUND ART

Optical disks are now commercially available storage media for storage of audio program material as well as digital information. The optical discs, whether storing audio program information or digital data, are generally sold in dedicated containers. While optical discs used for storage of digital information have a capacity much larger than that of a more conventional floppy disc; they are of course limited in the amount of data they can store. An even more severe limitation is found when the optical media are used to store audio program information because typically the commercial products store on the order of about 1 hour of audio program information. Therefore, a user typically has many optical discs and therefore the need for convenient storage of the optical discs for ready retrieval. Thus, it is an object of the present invention to provide a container for the storage of optical discs which enables the user to have those discs available for ready retrieval.

In accordance with the present invention the optical discs are stored in the containers within which they are puchased. Therefore, the present invention can be more aptly termed a container for optical disc containers. In accordance with the present invention, a prime component of the invention is a rectangular frame which has external length and width dimensions large enough so as to accommodate a pair of optical disc containers therein. The rectangular frame component of the present invention includes an optical disc container support so that an optical disc container can be contained within interior dimensions of the rectangular frame and be supported by the optical disc container support. By locating a first pair of optical disc containers on one side of the support, and another pair of optical disc containers on the other side of the support, the rectangular frame can accommodate four optical disc containers. The optical disc contaienr of the present invention further includes a pair of generally planar members which are each associated with frame means, so that each of the planar members can accommodate an additional two optical disc containers. Thus in accordance with the present invention, the optical disc container can store up to 8 dedicated optical disc containers.

The rectangular frame and the planar members are secured together to form a book-like assembly wherein the planar members and the rectangulars frame are rotatably secured together so that they function like leaves in a book.

Preferably, the optical disc container support and the planar members are each associated with adhesive-type attachment means for actually securing the optical disc container to either the optical disc container support or the planar members, respectively.

Preferably, the rectangular frame and each of the frame means associated with the generally planar members include permanent magnets for releasably retaining the rectangular frame and the generally planar members adjacent each other.

The rectangular frame and the frame means associated with the generally planar members further include edge cutouts to enable the user to open an optical disc container, while the container is retained within either the rectangular frame or the frame means.

Thus, in accordance with one aspect the invention provides a storage container for optical discs comprising:

at least one rectangular frame, said rectangular frame having interior and exterior dimensions with an interior length greater than twice a width of a conventional optical disc container, an interior width greater than a length of a conventional optical disc container and a depth greater than a depth of a conventional optical disc container, a pair of rigid, generally planar members, each of a length and width greater than the exterior length and width of said rectangular frame, hinge means joining said rigid, generally planar members into a book-like assembly providing for rotational movement for said rigid, generally planar members relative to each other about a longitudinal axis of said hinge means, at least one rigid optical disc container support, said support having a length and width slightly less than the inside dimensions of said rectangular frame so that said support can be inserted into said rectangular frame, and securing means for securing said rectangular frame to said book-like assembly.

BRIEF DESCRIPTION OF THE DRAWINGS

The present invention will now be described in the following portions of this specification so that, when taken in conjunction with the attached drawings, those skilled in the art can readily make and use the optical disc container of the invention. In the drawings, like reference characters identify identical apparatus and, more particularly;

FIG. 3 is a top view of the container of the present invention in a completely open condition;

FIG. 5 is a section taken on the lines 5—5 of FIG. 1.

DETAILED DESCRIPTION OF PREFERRED EMBODIMENTS

Figure 1:
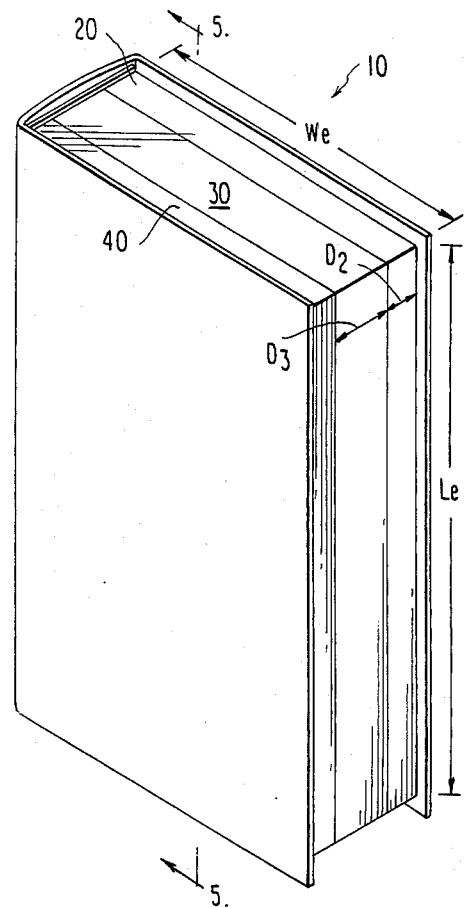
FIGS. 1 and 2 are isometric views of the container of the invention in respectively closed and partly open conditions.
Figure 2:
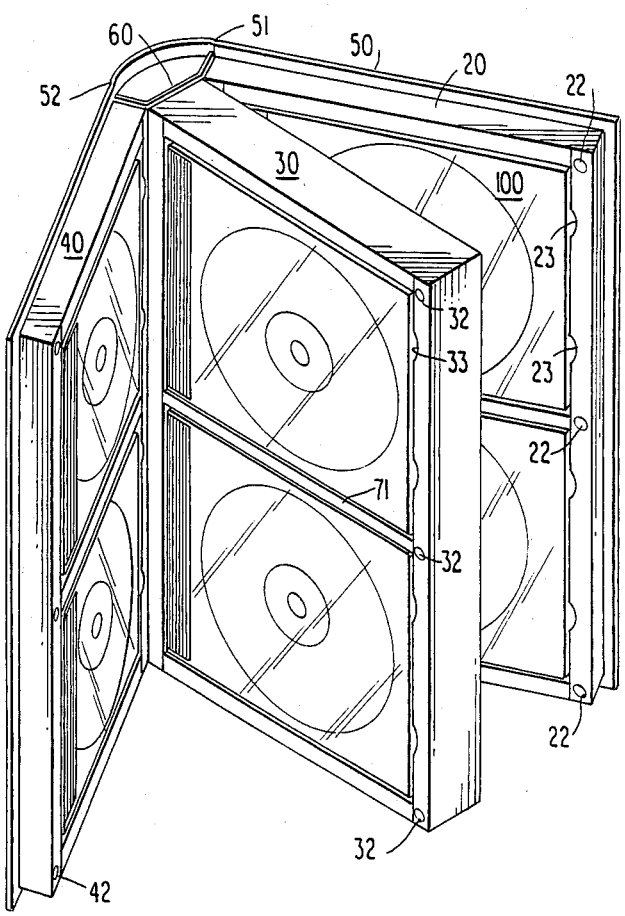

The optical disc container of the present invention 10 is illustrated in isometric views in FIGS. 1 and 2, where the container is shown closed in FIG. 1 and partly open in FIG. 2. More particularly, as will be seen in FIGS. 1 and 2, a major component of the invention is a rectangular frame 30 with an exterior length dimension Le and an external width dimension We which are respectively greater than twice the width of a conventional optical disc container and greater than the length of a conventional optical disc container. As seen in FIG. 3, the internal length Li of the rectangular frame (where Le>Li) is sufficient to accommodate twice the width of an optical disc container 100. Likewise, the internal width Wi of the rectangular frame (where We>Wi) is sufficient to accommodate the length of an optical disc container.

The thickness of the members forming the rectangular frame member decreases the area available for storage of an optical disc container. FIG. 3 shows that the rectangular frame element 30 includes interior dimensions having a length Li and a width Wi. As seen in FIG. 3, the length Li is greater than twice the width of the optical disc container 100, whereas the width Wi is slightly greater than the length of the optical disc container 100.

Figure 4:
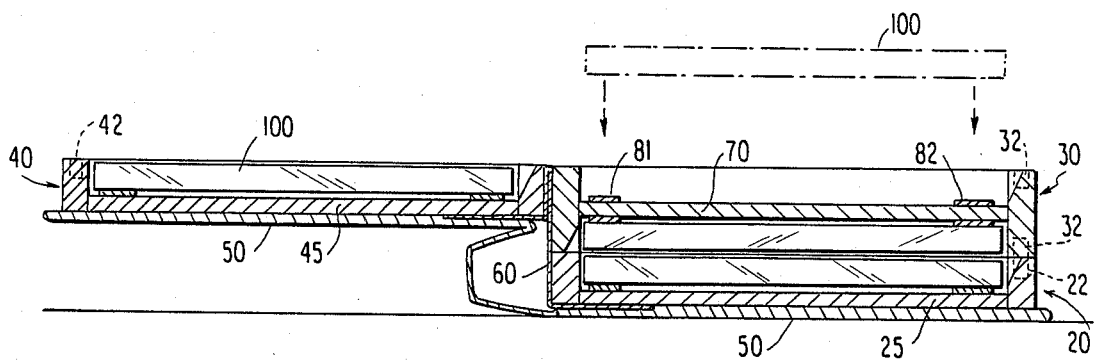
FIG. 4 is an elevation view of the container of the present invention in an open condition.

As seen best in FIGS. 4 and 5, the optical disc container 10 further includes a pair of generally planar members 25 and 45. Each of the planar members 25 and 45 is associated with a frame means 26 and 46, respectively, forming a pair of optical disc container compartments, two compartments associated with the planar member 25 and an additional two compartments associated with the planar member 45. Furthermore, the rectangular frame 30 includes an optical disc container support 70 and interior framing elements 71 and 72 so as to provide compartments for an additional four optical disc containers.

The thickness or depth $D_3$ of the rectangular frame 30 is sufficient to accommodate the thickness of the support 70 as well as two optical disc containers 100. On the other hand the thickness of depth $d_2$ of the frame means 26 (or 46) accommodates the associated phanar member 25 (or 45) and a single optical disc container 100.

The rectangular frame 30 and the framing means 25 and 46 are secured together with a flexible securing member 60 which secures the three components together so that they can each rotate with respect to each other about respective longitudinal axes.

Finally, a cover 50 is secured to the generally planar members 25 and 45 to form the entire assembly into a booklike arrangement where the frame means 26 and 46 and the rectangular frame 30 can be manipulated like pages in a book.

Referring more particularly to FIG. 2, that figure shows that the rectangular frame 30 includes insets therein, at its outer periphery comprising a plurality of magnets 32. The frame means 46 includes similarly located magnets 42, as is the case with the frame means 26. The respective magnets 22, 32 and 42, when the frame means are positioned adjacent the rectangular frame, provide for releasably securing these elements together. The user can easily overcome the magnetic force to open the container of the present invention.

FIG. 2 also shows that the rectangular frame, again at its outer periphery, includes a plurality of finger cutouts 33. Similar cutouts are shown in the frame means 26, at 23. Although it cannot be seen in FIG. 2, the frame means 46 includes similar finger cutouts 43 (in this respect see FIG. 3). The finger cutouts 23, 33 and 43 enable the user to obtain purchase on an edge of the optical disc container 100 so that it can be opened while the container lies within either the rectangular frame 30 or either of the frame means 26 or 46, respectively.

The optical disc container support 70 is associated with adhesive securing means 81 and 82, in the form of adhesive strips; these are best seen in FIG. 4. FIG. 4 shows, in dotted outline, an optical disc container which can be inserted into a compartment, and secured therein by the adhesive attachment members 81 and 82. FIG. 4 shows that both faces of the optical disc container support 70 are associated with the adhesive members. Likewise, the generally planar members 25 and 45 are also associated with similar adhesive members, for the same purposes.

The adhesive attachment members associated with the frame means 26 and 46 can be seen in the section of FIG. 5.

The rectangular frame 30, support 70, planar members 25, 45 and frame means 26, 46 may be formed of any of a wide variety of materials such as metal, wood, plastic, etc. In an embodiment actually constructed, these elements are wood. The flexible securing member 60 and cover 50 may be fabric, plastic, leather, etc.

It should be apparent that many changes can be made within the spirit and scope of the invention which is to be construed in accordance with the following claims.

I claim:

1. A storage container for optical discs comprising:
    at least one rectangular frame, said rectangular frame having interior and exterior dimensions with an interior length greater than twice a width of a conventional optical disc container, an interior width greater than a length of a conventional optical disc container and a depth greater than a depth of a conventional optical disc container.
    a pair of rigid, generally planar members, each of a length and width greater than exterior length and width of said rectangular frame, frame means associated with each of said planar members providing a pair of optical disc container compartments for each of said planar members,
    hinge means joining said rigid, generally planar members into a book like assembly providing for rotational movement of said rigid, generally planar members relative to each other about a longitudinal axis of said hinge means,
    at least one rigid optical disc container support, said support having a length and a width slightly less than inside dimensions of said rectangular frame so that said support can be inserted into said rectangular frame, and
    securing means for securing said rectangular frame to said book like assembly.

2. A storage container for optical discs as recited in claim 1, where said hinge means comprises a flexible book hinge.

3. A storage container for optical discs as recited in claim 1 which further includes:
    a cover element with a dimension slightly greater than said exterior length of said rectangular frame and a different dimension greater than a quantity representing twice exterior width of said rectangular frame.

4. A storage container as recited in claim 3 wherein said rectangular frame has a depth greater than twice a depth of a conventional optical disc container.

5. A storage contianer as recited in claim 1 wherein said optical disc container support is permanently secured to said rectangular frame.

* * * * *